(12) United States Patent
Castro et al.

(10) Patent No.: US 7,721,139 B2
(45) Date of Patent: May 18, 2010

(54) METHOD, APPARATUS, AND COMPUTER PROGRAM PRODUCT FOR MANAGING DATA IN A BROWSER-BASED APPLICATION

(75) Inventors: Paul C. Castro, Harrison, NY (US); Frederique A. Giraud, Ossining, NY (US); Ravi Konuru, Tarrytown, NY (US); John J. Ponzo, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 515 days.

(21) Appl. No.: 11/691,792

(22) Filed: Mar. 27, 2007

(65) Prior Publication Data
US 2008/0243935 A1 Oct. 2, 2008

(51) Int. Cl.
*G06F 11/00* (2006.01)
(52) U.S. Cl. .......................................... 714/4; 709/202
(58) Field of Classification Search ..................... 714/4; 709/202
See application file for complete search history.

(56) References Cited

U.S. PATENT DOCUMENTS

| | | | | |
|---|---|---|---|---|
| 4,703,481 | A * | 10/1987 | Fremont | 714/17 |
| 6,396,805 | B2 * | 5/2002 | Romrell | 370/216 |
| 6,854,115 | B1 * | 2/2005 | Traversat et al. | 718/1 |
| 7,028,306 | B2 * | 4/2006 | Boloker et al. | 719/310 |
| 7,130,964 | B2 | 10/2006 | Ims et al. | |
| 7,137,072 | B2 | 11/2006 | Bauer et al. | |
| 7,165,186 | B1 * | 1/2007 | Viswanatham et al. | 714/1 |
| 2004/0103373 | A1 * | 5/2004 | Wei | 715/513 |
| 2005/0015643 | A1 * | 1/2005 | Davis et al. | 714/4 |
| 2007/0233880 | A1 * | 10/2007 | Nieh et al. | 709/227 |
| 2008/0243935 | A1 * | 10/2008 | Castro et al. | 707/200 |

OTHER PUBLICATIONS

"DiffGrams," http://msdn.microsoft.com/library/en-us/appguide/html/cpcondiffgrams.asp?frame=true.pp. 1-3.
http://www.housingmaps.com.
Cardone et al., "Using XForms to Simplify Web Programming," ACM 1-59593-046-9/05/0005. WWW 2005, May 10-14, 2005, Chiba, Japan, pp. 215-224.
Nightingale et al., "Rethink the Sync," Department of Electrical Engineering and Computer Science, University of Michigan.
Iyengar et al., "Design and Performance of a General-Purpose Software Cache," Proceedings of IEEE INFOCOM'99, Mar. 1999.
Parr, "Enforcing Strict Model-View Separation in Template Engines," WWW2004, May 17-20, 2004, New York, New York, USA, ACM 1-58113-844-X/04/2005.

(Continued)

*Primary Examiner*—Emerson C Puente
(74) *Attorney, Agent, or Firm*—Cantor Colburn LLP; Kenneth Corsello

(57) ABSTRACT

A method, system, and computer program product are provided for managing data in a browser-based application. The application is opened in the browser, and a subset of the application is arbitrarily specified as data. Different versions of the subset of the application specified as data are caused to persist so that they may be recovered later. Persistence and recovery of the subset of the application specified as data are performed in a manner transparent to the application.

14 Claims, 8 Drawing Sheets

OTHER PUBLICATIONS

Kistler et al., "Disconnected Operation in the Coda File System," ACM Transactions on Computer Systems, vol. 10, No. 1, Feb. 1992, pp. 3-25.

Terry et al., "Managing Update Conflicts in Bayou, a Weakly Connected Replicated Storage System," SIGOPS '95 Dec. 1995, CO, USA, Copyright 1995 ACM 0-89781-715-4/95/0012pp. 172-183.

Bellas et al., "A Flexible Framework for Engineering 'My' Portals," WWW 2004, May 17-22, 2004, New York, New York, USA, ACM 1-58113-844-X/04/0005, pp. 234-243.

Castro et al., "A Programming Framework for Mobilizing Enterprise Applications," Dec. 2-3, 2004 WMCSA IEEE, pp. 196-205.

Neuberg, "Now in a Browser Near You: Offline Access and Permanent, Client-side Storage, Thanks to Dojo Storage," available at http://codinginparadise.org/weblog/2006/04/ now-in-browser-near-you-offline-access.html.

Cho et al., "Synchronizing a database to Improve Freshness," Oct. 25, 1999, pp. 1-30.

Burbeck, "Applications Programming in Smalltalk-80," http://st-www.cs.unuc.edu/users/smarch/st-docs/mvc.html, Jan. 11, 2007, pp. 1-11.

"Dojo 0.4.1 Is Now Available," http://dojotoolkit.org/, Jan. 11, 2007.

"W3C Document Object Model (DOM)," http://www.w#.org/DOM/.

"Mozilla2: Unified Storage," http://wiki.mozilla.org/Mozilla2:Unified_Storage, pp. 1-14.

"The XML HmpRequest Object," W3C Working Draft, Jun. 19, 2006, available at http://www.w3.org/TR/XMLHttpRequest.

Garrett, "Ajax: A New Approach to Web Applications," Feb. 18, 2005, http://adaptivepath.com/publications/essays/archives/000385.php, pp. 1-5.

Enabling Offline Web Applications, [online]; [retrieved on Jul. 9, 2007]; retrieved from the Internet http://gears.google.com.

\* cited by examiner

METHOD, APPARATUS, AND COMPUTER PROGRAM PRODUCT FOR MANAGING DATA IN A BROWSER-BASED APPLICATION

BACKGROUND

The present invention relates generally to data processing and interactive computer applications, and more particularly, to application state checkpointing.

In a traditional web application, the browser displays the user interface and mainly passes user input to a back-end server that is executing the core application logic. This ensures that web applications can run on base configurations of most browsers but can result in an inferior user experience when compared to an average desktop application. This problem arises because base configurations of browsers do not have access to a rich set of user interface elements, and the browser is locked to application code and state residing on a remote server. Most user input causes a mandatory page load, making the application feel less responsive and more disruptive for the user.

Modern applications leverage the browser's ability to execute Javascript and communicate with the server using asynchronous messaging. Application code and application state can be moved from the server to the browser, resulting in applications that have richer interfaces and improved responsiveness. Code executing in the browser has much more autonomy to manage the application state separate from the server-side components. For example, browser-based office applications may only require a server to store data documents while the browser handles all other document management operations. This has greatly improved user experience.

Because of the large improvement in user experience, it is likely that applications which rely heavily on script executing in a browser will be an important, if not dominant, design for web applications. This has implications in browser design, application programming models, and performance enhancing strategies for the web infrastructure. One such implication is the ability for these applications to checkpoint their states. Browser applications are subject to various failures, and there exists a need to capture all the necessary state information needed to seamlessly restart, a browser application on demand. Checkpointing is also fundamental for enabling other state management services, such as application suspensions and resumptions and operation undoes and redoes.

Applications built using browser-based technologies increasingly need to manage application state on the client-side. Unfortunately, the browser is mostly optimized to render static documents and lacks the proper programming and user abstractions for managing application state. Application state management within the browser itself is an afterthought, since traditionally all application state management has been done outside the browser. Programming an application for the browser requires extensive knowledge of workarounds to achieve consistent results. The browser's document model of programming applications is incompatible with common application programming models. The browser freely mixes view components, executable script, and data into a single renderable document, creating an application structure that is a patchwork of sections, each having their own visual components, data, and script.

Developers wishing to add checkpointing services to the application state must manually interpret the patchwork of code that may be spread over several files. This interpretation includes identifying what state needs to be captured in the checkpoint and manually wiring the application to use persistence services that may not be available at runtime.

Current browser-based facilities for managing application state rely on custom coded or limited script APIs and browser-based services for persistent data. While both are appropriate for relatively passive web browsing, more complex browser based application levy new requirements on application-state management, such as state versioning, handling intermittent connectivity, and synchronization.

Thus, there exists a need for browser enhancement to provide both developers and users with a way to mange client-side state management.

SUMMARY

According to an exemplary embodiment, a method is provided for managing data. An application is opened in a browser, and a subset of the application is arbitrarily specified as data. Different versions of the subset of the application specified as data are caused to persist so that they may be recovered later. Persistence and recovery of the subset, of the application specified as data are performed in a manner transparent to the application.

According to another embodiment, a system is provided for managing data. The system includes a browser for opening an application and logic for arbitrarily specifying a subset of the opened application as data, causing persistence of different versions of the subset of the application specified data, and recovering the different versions of the subset of the application specified as data. The logic performs causes persistence and recovers different versions of the subset of the application specified as data in a manner transparent to the application.

According to another embodiment, a computer program product is provided for managing data, comprising a computer usable medium having a computer readable program. The computer readable program, when executed on a computer, causes the computer to open an application in a browser, arbitrarily specify a subset, of the application as data, cause persistence of different versions of the subset of the application specified as data and recover the different versions of the subset of the application specified as data. Persistence and recovery are performed in a manner transparent to the application.

BRIEF DESCRIPTION OF THE DRAWINGS

Referring to the exemplary drawings wherein like elements are numbered alike in the several Figures.

DETAILED DESCRIPTION

According to an exemplary embodiment, shortcomings of application state management in conventional browsers is addressed. A framework is provided such that an application running in a browser can isolate the data from the other components within the application with minimal coding by the developer. This framework may be adapted to work for already existing applications as well as new ones. The framework enhances the isolated data by providing data capture and storage services to any running applications. The type of data to be captured may be interred from the application code, and that information may be used to provide the correct encoding of the data for storage. The correct persistence service for storing the application state may be determined, whether it is local relative to the browser or running on the network. From these low-level services, transparent undo and redo operations may be enabled for any application running in the browser.

According to exemplary embodiments, state-of-the-art browsers are provided with the capability to arbitrarily specify a subset of the application in a browser as pure data and to then transparently persist and recover different versions of that data without having explicit knowledge of the persistent mechanism used. This provides developers with increased flexibility to add persistence to their applications with significantly reduced development efforts. In particular, the embodiments described herein provide a more robust platform for developing rich and responsive applications by directly managing application state data for the application. The ability to checkpoint application state and store it local to the browser provides for more resilience to different types of failure and enables suspend and resume capabilities for applications. Since developers can view these services as first class entities on the browser, they can separate their application logic from these non-functional requirements, resulting in greatly reduced coding effort. For users, the embodiments described herein provide a consistent model of undo and redo capabilities that are independent of any single application. Users need no direct knowledge of the location of the application state that enables undo and redo or the mechanisms used to implement the service.

According to exemplary embodiments, data durability and synchronization are also improved for browser-based applications. In contrast to conventional browsers, which require custom code for synchronization, according to exemplary embodiments, browsers are provided with a generated service for storing a history of application states to enable functions, such as undo/redo operations, playback, and version management. The application state may be stored in a manner that is transparent to the user and works not only for page reloading but also across application and browser sessions. Developers can add these services to their applications with significant reduced development effort.

Figure 1:
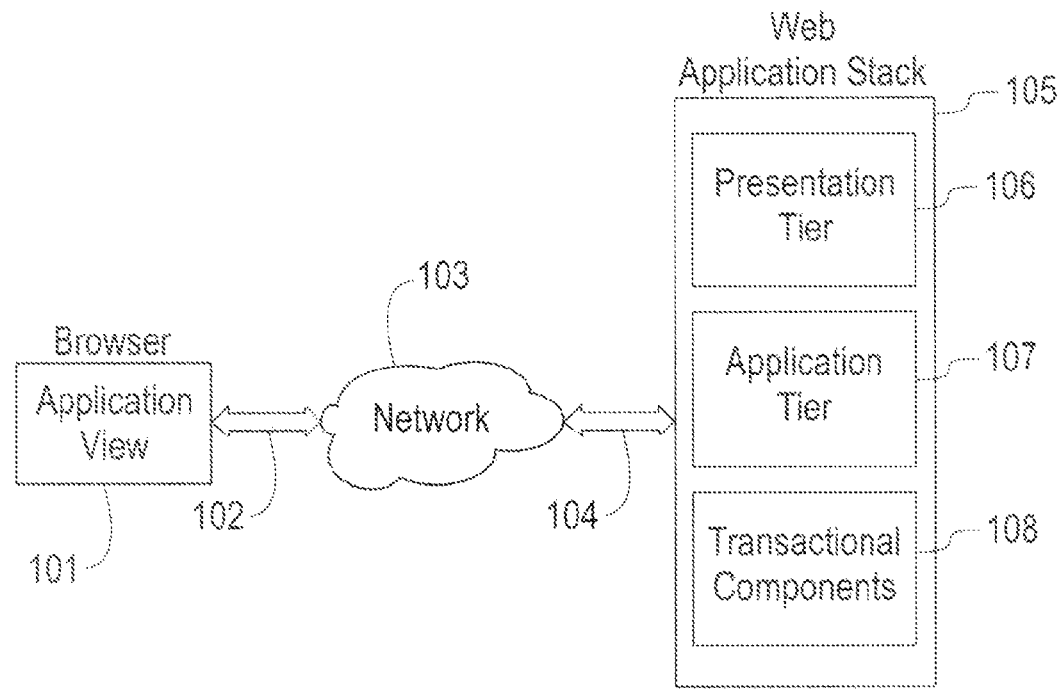
FIGS. 1 and 2 show the evolution of web application and browser architecture design.

To facilitate understanding of how exemplary embodiments differ from conventional browser-based applications. FIG. 1 shows the architecture of a traditional web application. FIG. 1 depicts a browser 101 that communicates with a services platform 105 (also referred to as a web application stack) to run an application. In FIG. 1 the services platform can logically be broken up into three tiers. The presentation tier 106 creates the user facing view of the application in the form of a document that the browser can render. A typical presentation tier includes text, user interface widgets like buttons and form fields, and a little script to handle simple tasks like form field validation. The application tier 107 is responsible for executing all application logic. The application tier can interact with a transactional layer 108 that is responsible for storing data.

In the architecture of FIG. 1, the browser 101 is mainly a passive element that renders the view received from the presentation tier 106. The user interacts with the browser 101, which forwards all processing requests to the web services platform 105 via a communications network. The communications network may include any suitable combination of connections and networks 102, 103, 104. The connections 102 and 104 may include, for example, wireless or wireline, digital satellite connections, broadband connections, high speed internet connections, cable connections, etc. The network 103 may include the Internet, a LAN, a WAN, etc. No critical logic is executed in the browser 101. Users are generally required to follow a request-response cycle with the web services platform 105 for every interaction with the application.

This tiered architecture scales well and maintains separation between presentation logic, application logic, and data management. This architecture mirrors the Model-View-Controller (MVC) design pattern in software architecture, the details of which are described, e.g., in Burbeck et al., "Application Programming in Smalltalk-80: How to use Model-View Controller (MVC)", University of Illinois in Urbana-Champaign (UIUC) Smalltalk Archive http://st.-www.cs.uiuc.edu/users/smarch/st-docs/mvc.html. MVC is recognized as a pattern that can simplify software development and provide robust and maintainable software. In MVC, the model can be thought of as application data, the view is the user interface for interacting with the model, and the controller processes user events from the view to update both the model and view as needed. This pattern is often implicitly followed by traditional web applications with the browser embodying the view of an application and the server implementing both the model and controller.

Figure 2:
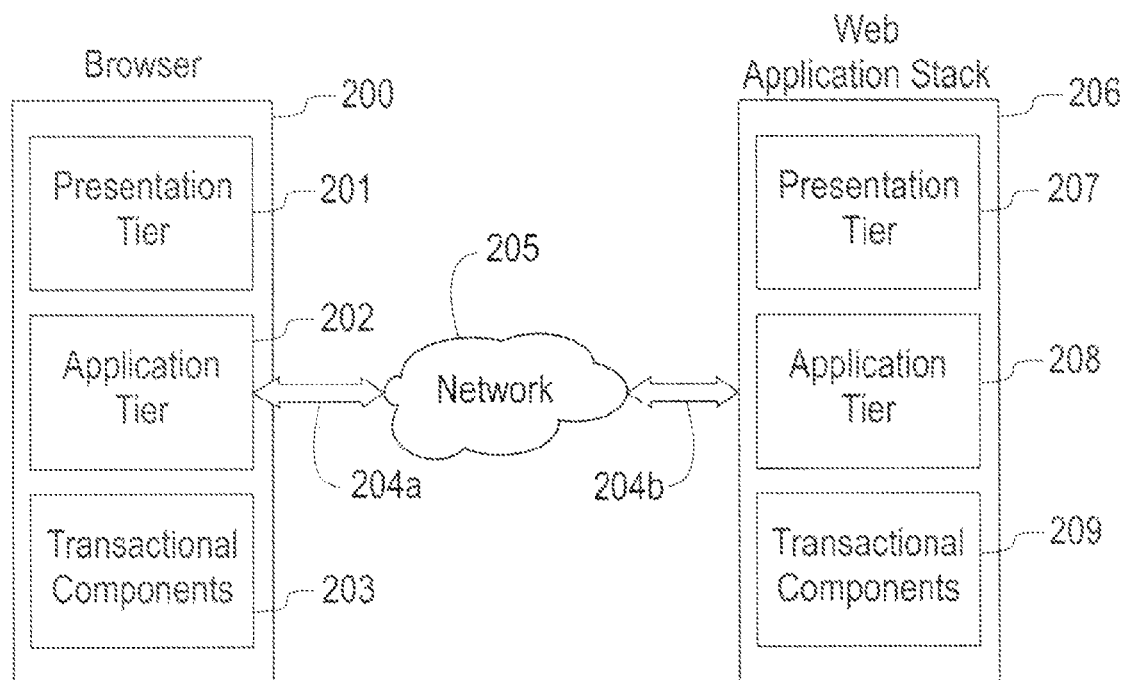

Browser technologies have evolved and browsers now have the capability to execute code that transforms them into more active components of a web application. FIG. 2 snows the shift that is occurring for many newer web applications. Motivated primarily to give the user a richer, interactive, and more responsive interface, developers are increasingly projecting presentation, application, and transactional functions onto the browser. In FIG. 2, the connections 204a, 204b and network 205 between the browser 200 and the web service platform 206 may include any suitable components for communicating between the browser and the web application platform, such as those described above with reference to FIG. 1. As in FIG. 1, the browser 200 renders its view. However, it is more engaged in executing the logic formerly executed on the backend web services platform. This can be thought of as moving parts of the presentation tier 207, application tier 208, and transactional tier 209 to coordinated subsystems 201, 202, and 203, respectively, with shared functionality on the browser. These parts may be resident on the browser prior to the application loading or be loaded along with the application.

This newfound autonomy from the backend can enable new types of applications with new forms of interaction. However, problems arise given the browser's historical role as a document renderer. Major browsers, such as Internet Explorer and Mozilla Firefox, provide a Document Object Model (DOM) interface to the currently rendered web page. The DOM is a container for all page objects, such as presentation elements and script. The structure of the DOM freely mixes data and the presentation elements that use them. For example, a text field element contains a "value" attribute which should be displayed in the text field. Further details of a DOM may be found, e.g., at http://www.w3.org/DOM/.

In the architecture shown in FIG. 2, some of the management responsibility for data is moved to the client. Current browser abstractions provide little or no facility to manage this state without custom Javascript code. What was naturally separated on the server-side becomes intertwined as a single web page on the client-side. The browser DOM must function as a "catch-all" container for application script, presentation elements, and non-visual application data. Fundamentally, the developers force fit an application model onto a document model that is not optimized for it. For example, since it is optimized for visual elements, the browser DOM is not an efficient storage mechanism for non-visual data. Base DOM elements contain slew style attributes that are only useful for presentation elements, increasing the footprint unnecessarily when storing non-visual data. Applications may benefit from not instantiating certain application data as DOM elements at all. Current-browser implementations generally do not allow this.

According to exemplary embodiments, the issues of data separation, determination of data type for handling, determination of persistence service for storage and retrieval of data are addressed. Developers are provided with the capability to specify the parts of the application that should be treated as data and thus require special handling, in some cases, this specification may include third party embedded scripts that have private data handling routines. In addition, according to exemplary embodiments, the type of data it needs to handle is inferred so it can properly perform its state capture, storage, and retrieval functions. Also, the appropriate persistence mechanism for storing the application data may be discovered.

Figure 3:
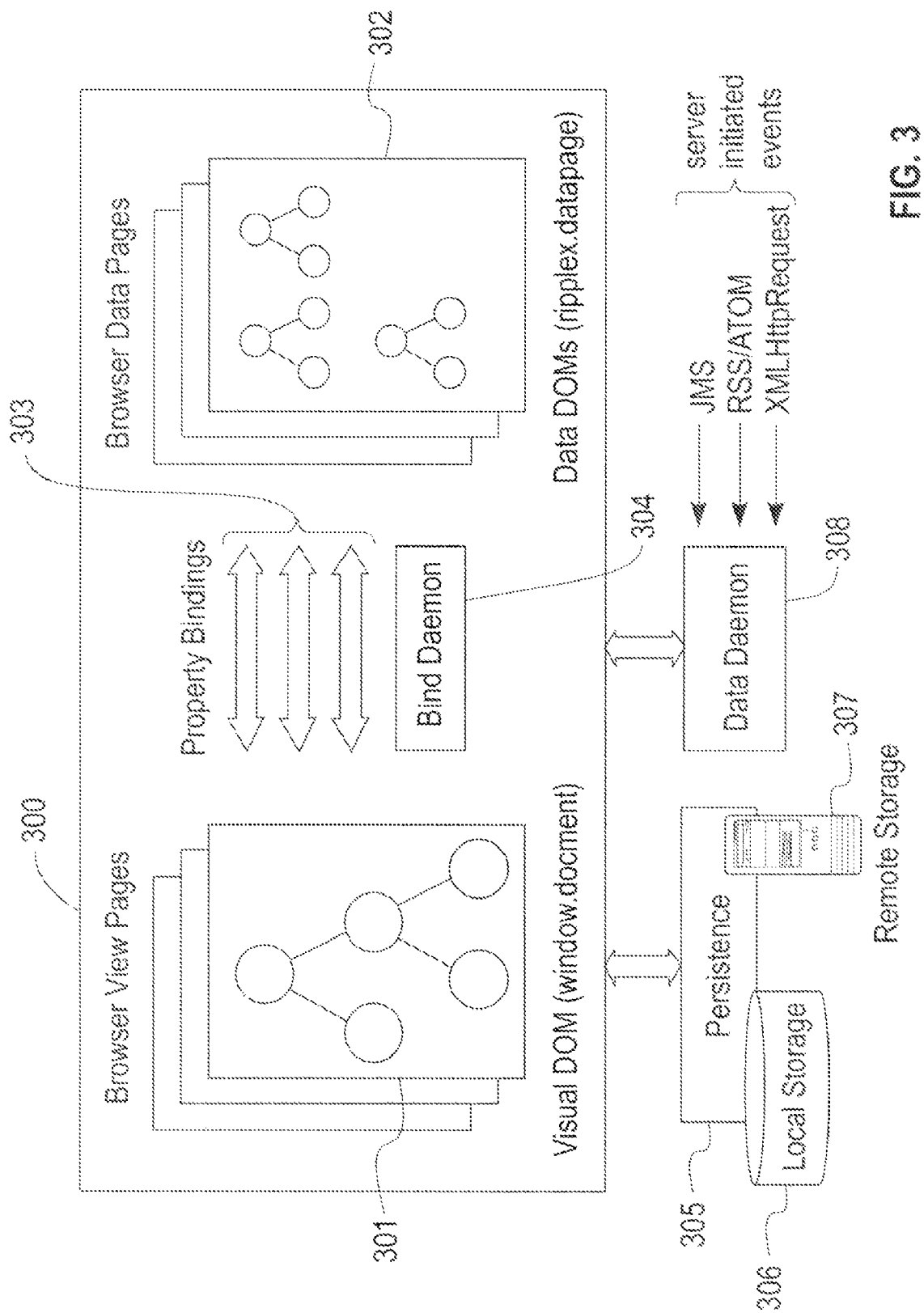
FIG. 3 shows how data can be separated from an application executing in the browser.

Regarding data separation, FIG. 3 shows how the MAC pattern may be projected onto a browser 300, and data checkpointing and persistence services may be provided according to exemplary embodiments. An application may be logically separated into two parts. The first part is the traditional browser DOM, or browser view pages 301, which still maintains its responsibility as a container for visual components and script. The second part is the application data, or browser data pages 302, that is used by the browser's visual components and script. As explained above, in MVC, the application data is the model, the visual components are the view, and the script (along with other mechanisms) form the controller. So, in the system shown in FIG. 3, the browser view pages 301 and browser data pages 302 may be considered the model the visual components (not shown in FIG. 3) may be considered the view, and the property bindings 303, bind daemon 304, and data daemon 308 may be considered the controller.

In FIG. 3, the left side represents the traditional browser. When the browser opens, the visual DOM is rendered. Non-visual components are taken out and separated. So, e.g., a table of data that is shown as part of a web page contains data that may be separated out, updated, etc. The data daemon 308 receives server-initiated events, e.g., JMS, RSS/ATOM, and XML Http Requests, and provides this to the bind daemon 304. The property binder attaches the visual and non-visual data used for rendering the non-visual data and updating it. The data daemon 308 is an interface to a server, responding to request to the browser. Requests may be made to the browser from the server while a user is using an application in the browser. The data daemon 308 manages the data in the data pages. So, when a web page is loaded, the user is provided with a webpage shown. However, in the background, a data tier is running which can be updated. The persistence unit 305 allows data to be saved somewhere, e.g., locally in local storage 306 or in remote storage 307. Then, when the browser opens, the data is pulled from the storage. Code running in the browser manages persistence. The data daemon 308 may be included as an add-on to the browser.

Figure 4:
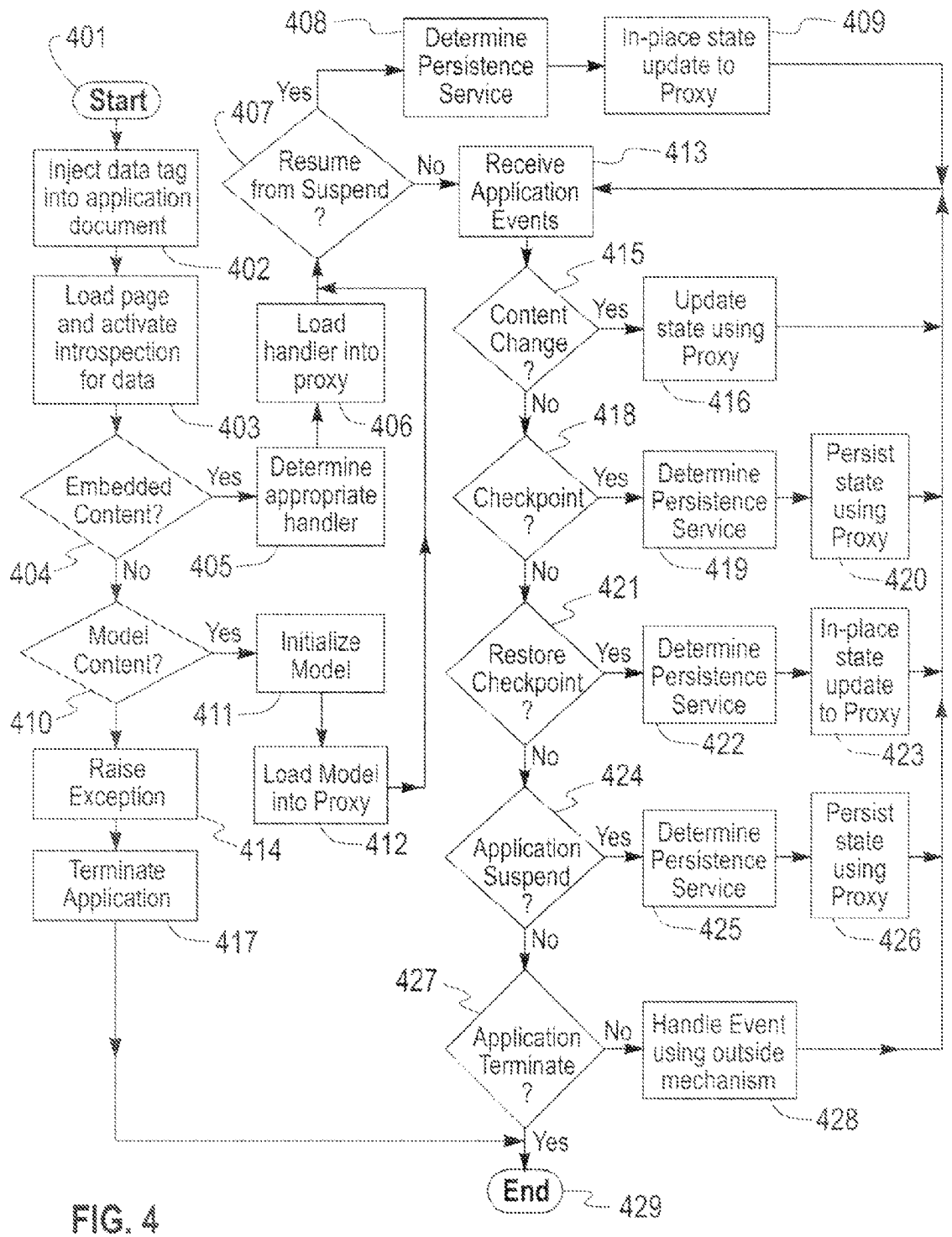
FIG. 4 is a flow chart depicting an exemplary method for managing an application state in the browser according to an exemplary embodiment.

FIG. 4 is a flowchart depicting a method for determining the type of data being handled and its general behavior within the context of a running application according to an exemplary embodiment. The method begins at step 402 at which a data tag is injected into an application document with functions described herein. This step may be performed by a developer. In this step, the developer can include a set of code libraries as part of the application logic that implements the functionality. The developer can equivalently access an application programming interlace (API) if the functionality is implemented as a core component in the browser. In either case, the data tag may be implemented as a computer readable program on a computer readable medium. In the latter case, this may still entail the loading of code libraries that provide the API. In the former case, this code library can be in the form of script code or added as a module to a browser's built-in extension framework and loaded using that framework.

The libraries loaded in step 402 activate inference code when the browser initially loads and parses the application document it receives from the backend at step 403. The inference code has two purposes. First, it isolates the scope of its search to a portion of the document loaded into the browser. Second, it determines the type of data contained inside its scope. For the former, isolation can be achieved by noting that the application is structured as a hierarchical tree in the browser DOM. This structure naturally separates into subtrees that can be specified by marking the node in the document that functions as the root of the subtree. The mark on the node triggers a handler that keeps a reference to the node so the inference code can later analyze it. Other methods for marking the document are also possible.

To determine the type of data that is being isolated, the inference code inspects the subtree for content type at step 404. Type has no deep semantic meaning in this case, and the main function of step 404 is to match the data to a specific proprietary handler that knows how to parse the subtree for data. In FIG. 4, there are two main types: embedded content and model content. Model content is a generic type that is independent from any specific application and can be used as a default by application developers. For example, the XML Data Islands, http://ajaxpatterns.org/XML_Data_Island, specification provides a generic data type that can be used as the default model content according to an exemplary embodiment. Embedded content, on the other hand, is very specific to the application and may not include just data but also visual components and script. For example, it is possible to embed maps into an application where the maps are provided by an outside service. This embedded map may come with its own proprietary API and a specific handler routine must be used to handle its content.

To determine the data type, the inference code can compare the subtree to templates that match it to different types of content. The simplest case is that the subtree is self-describing and contains enough information to determine its type directly.

In the case that the subtree is embedded content, the inference code determines the appropriate handler for the content at step 405, and the handler is loaded into the proxy at step 406. This handler is similar to a hardware device driver on a desktop computer. The handler handles the specific and proprietary interface of the embedded content and acts as an interface between the content and a generic data proxy used by the inference code. The data proxy provides a consistent interface over various types of embedded content.

In the case that the subtree is determined not to be embedded content but instead is determined to be model content at step 410, the inference code instantiates the model without needing a handler at step 411. Model content can be thought of as just another type of embedded content except optimized for use with the inference code. As an optimized structure it may be represented in a compact form and easily transportable within the library code. Like the embedded code, it also is loaded into a data proxy at step 412.

In the case that the inference code cannot determine the subtree type, then it must take corrective action. The process depicted in FIG. 4 causes the application to raise an exception at step 414 and aborts as a default at step 417.

After the data is isolated, the browser continues to load, the application. Once the application is completely loaded but before it executes, a check is made to see if the currently isolated data needs to be updated with data from a previous application session at step 407. This is usually a user specified requirement and can be done via direct interaction with a user or from reading a configuration file. If the current data needs updating, existing persistence services are searched as necessary to collect the data from the previous application session at step 408. Once this is done, the current data is replaced with the collected data at step 409. The application then executes as normal.

Replacing the application state with the previously checkpointed state requires that a determination be made as to what content needs updating, appropriately updating the data, and informing any component that relies on the data that the data has changed. Details of this are application specific. In the MVC design pattern, the model would again be updated using the controller components (e.g., in the form of application script). The controller would also inform the view components of the updates to the model.

The application can be viewed as mainly reacting to user-level events received during its operation at step 413, though this does not preclude processing of events that are not user-level. While the flow chart describes the basic events that are part of the overall process, the totality of events the application will process may include other aspects of operation not specified here. The relevant events that are detected are content change, detected at step 415, checkpoint request, detected at step 418, checkpoint restore request, detected at step 421, and application suspend, detected at step 424. An application terminate event may also be detected at step 427, which will result in the process ending at step 429.

In the case of a content change event detected at step 415, the model is updated through the data proxy at step 416.

In the case of a checkpoint request detected at step 418, the appropriate persistence service is determined at step 419. The data proxy is called to capture and encode the current application state at step 420. The state using the acquired persistence service may then be stored.

In the case of a checkpoint restore request detected at step 418, the appropriate persistence service is determined at step 422, and the checkpointed state is retrieved. An in-place update of the state is performed at step 423.

In the case of application suspend event detected at step 424, the process proceeds as if a checkpoint request was issued and acquires an appropriate persistence service at step 425. There may be a need to record that the suspended state exists during this step. In this case, the persistence service is used to store the state. In FIG. 4, requesting an application suspend does not necessarily terminate the application. An additional application terminate event may be needed.

According to an exemplary embodiment, the techniques described herein can be used to mask from the user any location dependent information regarding available persistence services for the application. As the browser becomes more capable of accessing local services, such as the local file system or a database running on the same platform, applications executing in the browser will want to take advantage of the most appropriate persistence service available. Developers generally do not know what persistence services will be available during application development, and thus an automated means to determine this at runtime would prove useful to browser-based applications.

Figure 5:
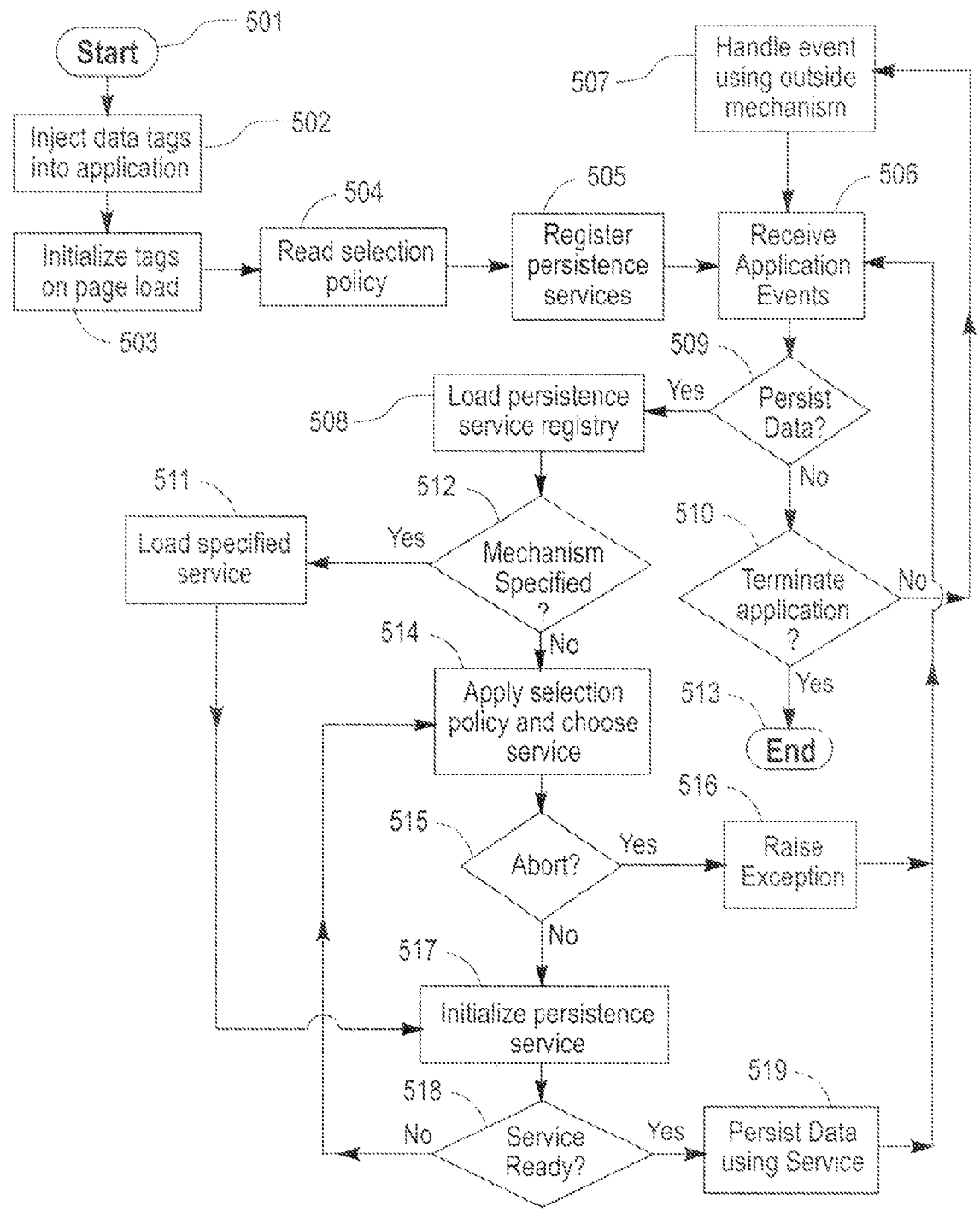
FIG. 5 is a flow chart depicting an exemplary method for determining persistence services available to the browser according to an exemplary embodiment.

FIG. 5 is a flowchart depicting a process for discovering a persistence service according to exemplary embodiments. As in FIG. 4, once the process depicted in the flowchart in FIG. 5 begins at step 501, the appropriate libraries are injected into the application before it is loaded into the browser at step 502. This can include loading libraries with the application or taking advantage of an existing API in the browser. Similarly to FIG. 4, the libraries initialize during the page reload at step 503.

During initialization, a user-specified selection policy can be loaded for ranking any available persistence service in terms of its appropriateness to a task at step 504. For example, a selection policy may be included in the application that states that local persistence services (to the browser) are preferable over remote persistence services. In another example, a selection policy may be included that states that remote persistence services are preferable except in the case of an application suspend request. In the case of such a request, a local persistence service could be selected, or if none exist, the persistence request may be aborted.

Once the policy is read at step 504, persistence services are searched for and registered at step 505. This step acts to initialize a registry of potentially available persistence services, which is updated during the execution of the application. For example, the application can read a configuration file that specifies what services are available. The application can alternatively check for the availability of services from a default list provided at application development time.

Once registration is completed, the application receives events as in FIG. 4. In the same manner as FIG. 4, FIG. 5 specifies actions for events that are relevant to the current task of persisting data, and other application events are assumed to be handled by an outside mechanism at step 507 but not specified. For FIG. 5, the event is a persist data request detected at step 509.

When a persist data request is detected, the persistence service registry is accessed at step 508. If the persistence data request is determined to specify the desired persistence service at step 512, an attempt is made to connect to that service using the appropriate interface at step 511. The persistence service is then initialized at step 517, if necessary, and a determination is made whether the service is ready at step 518. If the persistence service is ready, then it stores the data using any parameters specified in the persist data request at step 519.

If the persistence service cannot be made ready, e.g., it is not available, for any reason, the selection policy may be applied to the services in the registry, and a new service may be chosen to try and activate at step 514. The steps above are repeated until the data can be successfully stored. If available services are exhausted, then the selection process is aborted at step 515. An exception can be raised at step 516 to inform the application that the persist data request failed. The application may then take an appropriate action.

As in FIG. 4, the flowchart in FIG. 5 also specifies that the application will terminate on an application termination request (steps 510 and 513).

Figure 6:
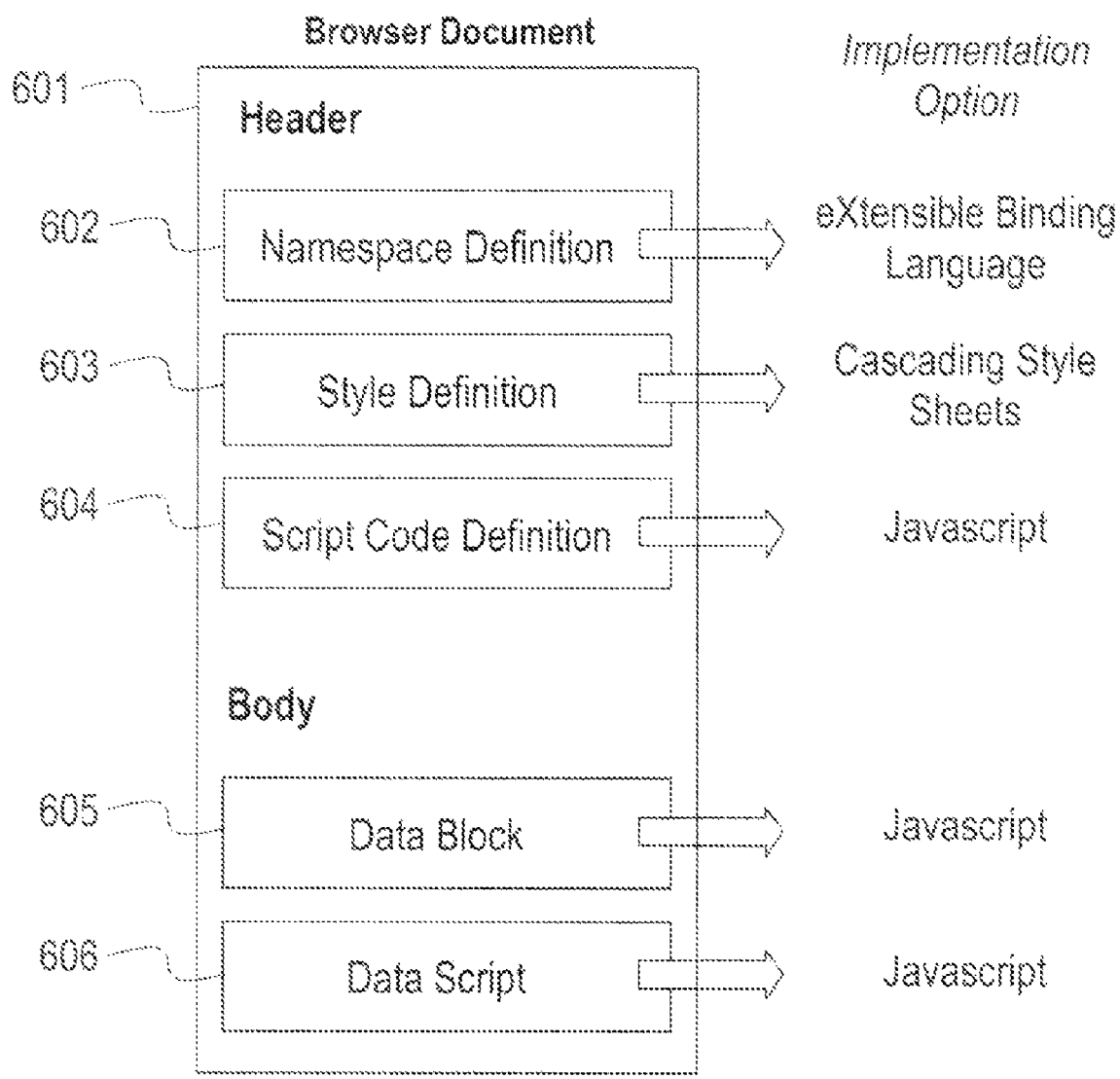
FIG. 6 illustrates a set of libraries and specifications that may be implemented in a browser without modifying the browser source code, according to an exemplary embodiment.

According to exemplary embodiments, the processes and functionality described above may be implemented as part of the browser, or as libraries that are loaded into the browser at runtime. The advantage of the former option is a faster load time for applications and potentially optimized performance. However, this requires changes to the browser source code, which can be difficult. FIG. 6 illustrates the latter option, in which a set of libraries and specifications are included in the application when it is downloaded. This approach does not require modifications to the browser but may increase application load time and be more difficult in terms of optimizing the performance. In FIG. 6, a standard browser document 601 contains a header and a body. The browser document contains all the natural elements of a standard document but is enhanced, according to exemplary embodiments, with references to library documents. In FIG. 6, the header contains references to a namespace definition 602 which defines a set of declarative tags. A style definition sheet 603 links the function of these tags to a style that can be applied to the standard browser namespace to augment its functionality. This is namely used for compatibility with existing applications. Finally, a script code definition library 604 is included which contains the logic needed to implement at least the functionality in FIG. 4 and FIG. 5. When the application loads, the browser automatically also downloads the code referenced in the header.

In the body of the browser document of FIG. 6, the application can include a data block 605 that is script that defines a data portion of the document. There may be more than one data block for a single application. This data block maps to the model and embedded content described with reference of FIG. 4. Finally, FIG. 6 includes a final data script block 606 that represents application specific code that references the libraries referenced in the header.

FIG. 6 also shows options that can be used to implement the different components in the browser document. The purpose of this is to show how the techniques described herein can be realized using browser development tools that do not require changing the browser source code. As an example, the eXtensible Binding Language is a development toolkit that allows the definition of new namespaces for a browser. Cascading Style Sheets are standard in all popular browsers and allow the browsers to separate out style information from structural information in a browser document. Javascript is the standard scripting language for browsers and a common development language for application logic that executes inside a browser. It should be appreciated that these implementation options are provided as examples but that other implementations may be used, as appropriate.

Figure 7:
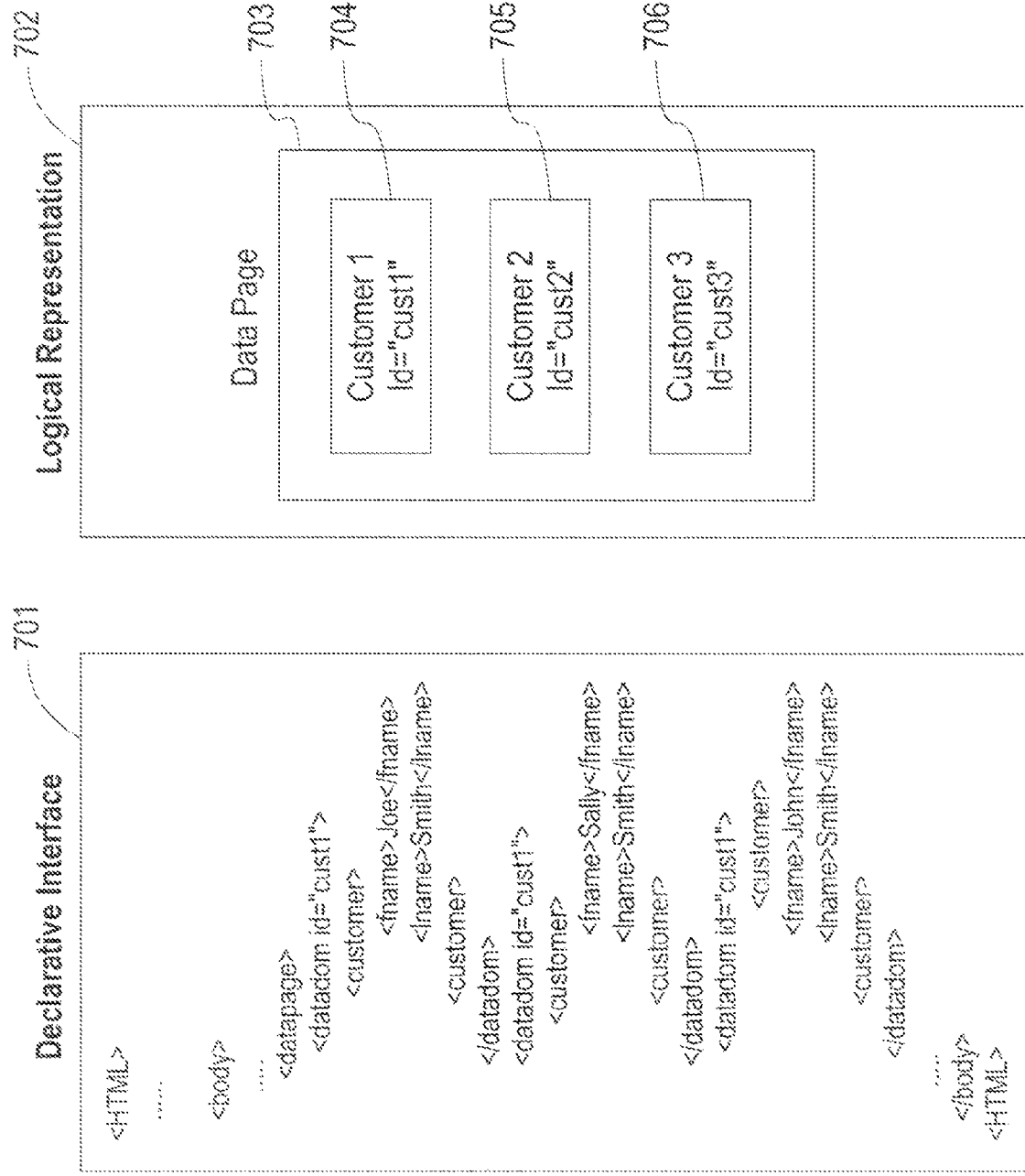
FIG. 7 shows an additional markup that functions as a declarative library according to an exemplary embodiment.

FIG. 7 provides an example of how data can be declared in a browser using the namespace definition. In FIG. 7, a browser document contains standard XHTML tags (not highlighted) and new XML tags that define the data namespace (or declarative interface) 701. FIG. 7 also shows how the namespace creates a logical representation of the tags 702. The tags:

<datapage>
<datadom> are new. The "datapage" tag references the data page of FIG. 3 and specifies that its contents are all part of the non-visual data of the application data page 703. The "datadom" tag refers to individual data items contained in the data page. In FIG. 7, the namespace defines three customer records 704, 705, and 706, each containing the first and last names of a customer (or user). Each data record has a unique identifier that can be used later to retrieve the customer record.

Figure 8:
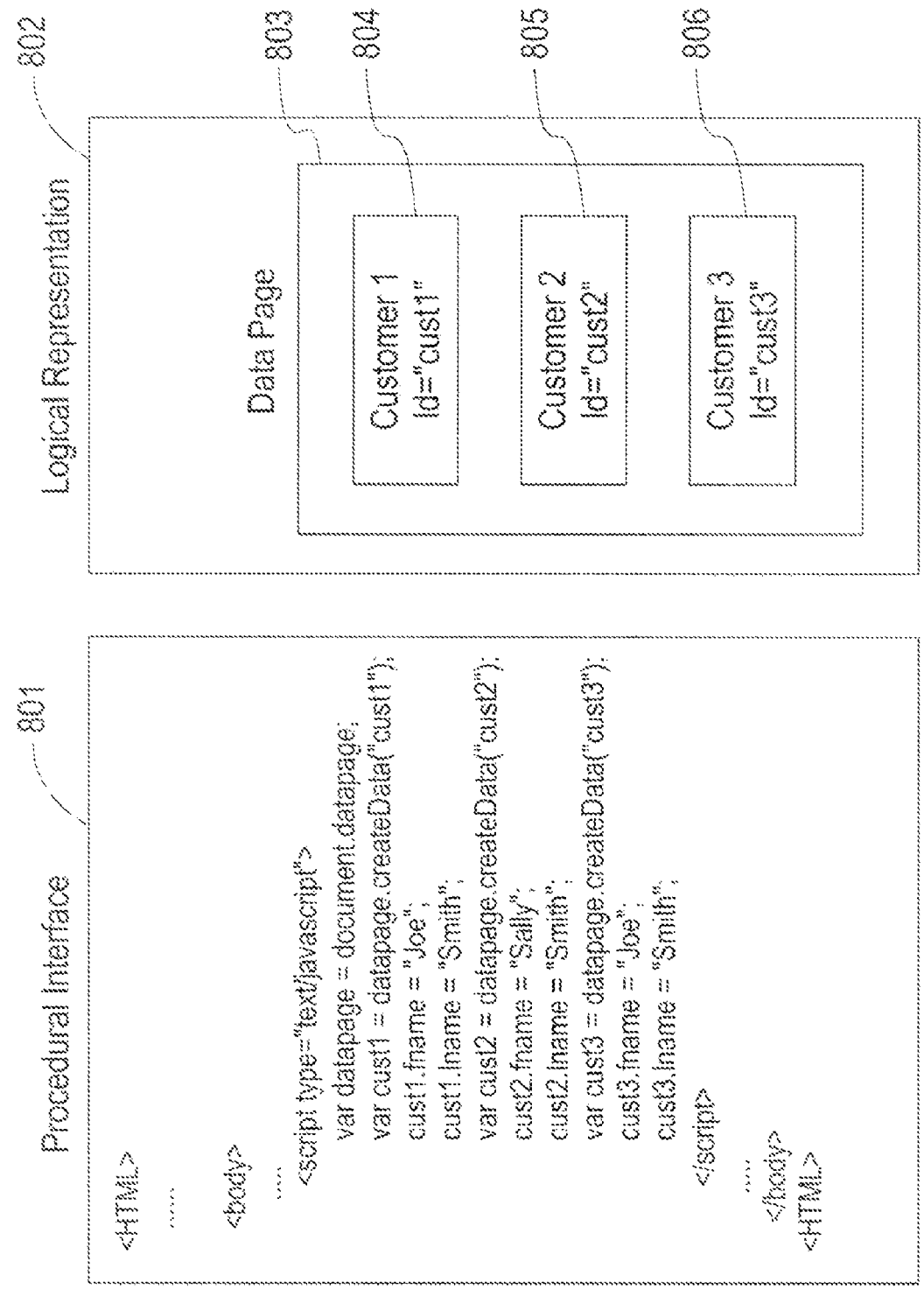
FIG. 8 shows sample code that functions as a procedural library according to an exemplary embodiment.

FIG. 8 shows an equivalent browser document that defines the same datapage with three customer records, using a procedural approach rather than a declarative approach, in FIG. 8, a browser document contains a script block in Javascript that creates the customer records 801. The logical representation 802 is similar to that shown in FIG. 7. The script references the data page 803 as a global object that is defined when the browser is loaded with functionality as described above. Using this global object, the application calls standard methods to create the customer (or user) data records. As in FIG. 7, this results in three logical customer records 804, 805, and 806.

Once the application declares its data page, and logical representation of the data is created, the application can access the customer (user) records as objects that reference the aforementioned checkpoint and persistence methods.

Checkpointing allows applications to maintain a tagged version of the running application state. This can provide a base level for tagging and checkpointing the current state by calling a checkpoint (tagname, mode) method on the datadom. According to exemplary embodiments, there are at least three modes for checkpointing: in-memory mode, persistent mode, and remote mode. In the in-memory mode, a checkpoint is created and stored in-memory. This checkpoint exists for only the current application session. In the persistent mode, a checkpoint is created and serialized. The application can store this string in an appropriate persistence mechanism. The remote mode is similar to the persistent mode, except the serialized version of the application state is sent to a storage service located on the network. Using the remote mode, users download and share checkpoints with each other via the server.

The application can restore a checkpoint by calling a restore checkpoint method according to an exemplary embodiment. A mode parameter can be included as an optional parameter to the call where the mode directly specifies the persistence service to be used. By default, if the mode is not specified, the selection policy as shown in FIG. 5 may be used to select the mode.

For example, using a script interface, the application could call calls;

var portfolio=document.datapage;

portfolio.checkpoint("MyCheckpoint", ripplex.MEMORY_MODE)

which would store the checkpoint using the in-memory mode. According to an exemplary embodiment, restoring the checkpoint requires the call:

portfolio.restoreCheckpoint("MyCheckpoint")

In persistent and remote mode, applications can use checkpointing to restore an application state to a previous state across page reloads and browser sessions.

Figure 9:
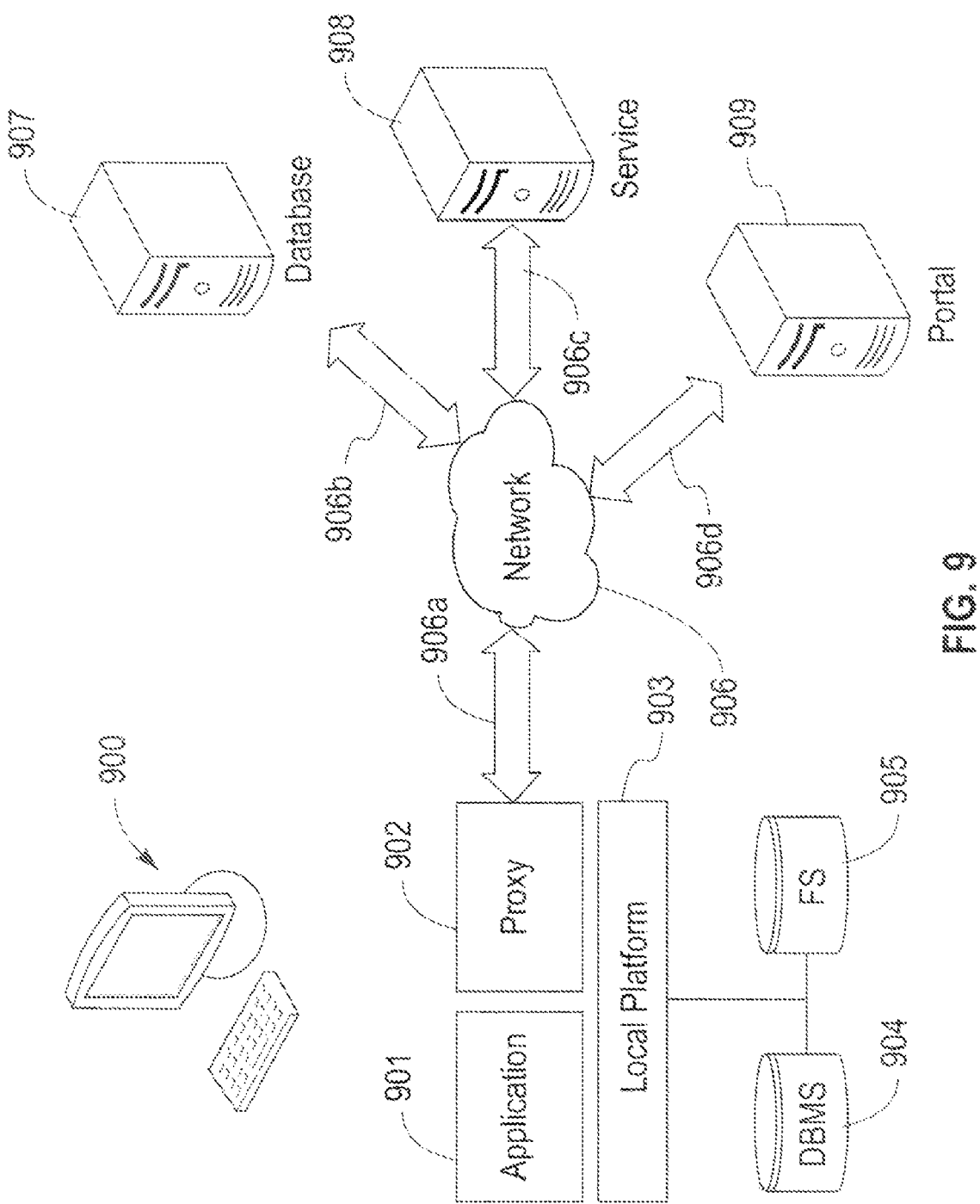
FIG. 9 shows a high-level system implementation of an application using persistence locating services according to an exemplary embodiment.

FIG. 9 provides an overview of a running application and shows the basic components needed for enabling undo and redo for a browser application. In FIG. 9, the application 901 runs on the local application platform 903, e.g., an operating system or a virtual machine, that runs in a standalone client 900. For illustrative purposes, it is assumed that the application state is already specified, and introspection has already occurred.

The checkpoint is the unit of data from which a history of operations is constructed to enable undo and redo. For example, as the user fills out a form in an application, the application creates and stores checkpoints each time a field in the form is changed. This creates a history of checkpoints ordered by the time they were created. When the application wants to undo, this means that the checkpoint immediately previous to the current state should be retrieved and used to update the data. When the applications want to redo, this means that the next stored checkpoint in the history of checkpoints should be retrieved and used to update the data.

The proxy 902 in FIG. 9 represents the component that implements the procedural and declarative interfaces described above. From the figure, it can be seen that the proxy 902 also runs on the local platform and can communicate over a connections 906a, 906b, 906c, and 906d and network 906 to several remote persistence services 907, 908, and 909. The connections 906a, 906b, 906c, and 906d may include any suitable connections, e.g., wireless or wireline connections, digital satellite connections, high speed internet connections, broadband connections, cable connections, etc. and the network may include any suitable network, e.g., the Internet, a LAN, a WAN, etc. It is not strictly necessary for the proxy 902 to run locally. It is sufficient for the proxy 902 to run anywhere the browser application can access it. For example, it can run on the point of origin of the application, i.e., where the browser initially downloads the application.

In FIG. 9, the proxy has access to both network-based services and a database 904 and file system 905. These services register with the proxy as described with referenced to FIG. 4. When the application calls for a checkpoint, the proxy applies a selection policy and uses the most appropriate service for storage. A similar method is used when the application seeks to retrieve a checkpoint, in this ease, the proxy searches for the service that stores the named checkpoint using a selection policy optimized for that particular search. In the case of undo and redo operations, the proxy can provide the functions for storing a history of checkpoints, or it can access a service that provides this function.

According to exemplary embodiments, a set of browser extensions is provided that separate data from presentation and allow separate management of the data through scripting code and declarative interfaces. This greatly simplifies the programming model for applications, such as AJAX, and allows users to recover work across page and browser sessions. The browser extensions may be implemented using browser scripts or as separate add-on components, such as a Mozilla FireFox extension. To enable checkpointing, the methods, systems and computer program products described herein enable a user to define a part of the browser based application as "data" that can be managed, create a checkpoint of that data and store the checkpoint in memory (locally or remotely) using a server-based persistent service. Additionally, checkpointing may be enabled on existing applications with minimal modifications using browser system sheets.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for managing data, comprising:
opening an application in a browser on a computer;
arbitrarily specifying a subset of the application as data by analyzing page elements in the browser to determine an application state to capture;
causing persistence of different versions of the subset of the application specified as data;
recovering the different versions of the subset of the application specified as data, wherein causing persistence and recovering are performed in a manner transparent to the application;
wherein analyzing the page elements comprises:
separating application data components from the rest of the application;
determining the type of application data components;
loading an appropriate handler for the data components; and
accessing handler functions through a generic and consistent interface.

2. The method of claim 1, wherein causing persistence comprises:
analyzing available persistence services for storing the application state for later retrieval; and
storing the application state using an available persistence service.

3. The method of claim 2, wherein recovering comprises:
discovering the stored application state for retrieval;
retrieving the stored application state;
replacing a current application state with the retrieved stored application state;
suspending an application running in the browser by saving the retrieved application state; and
resuming the application based on the saved application state.

4. The method of claim 3, wherein the retrieving comprises:
identifying the persistence service used to store the application state;
calling the identified persistence service to retrieve the stored application state.

5. The method of claim 3, wherein replacing the current application state comprises:
converting the retrieved application state into data usable by the application; and
updating the current application with the converted application state data.

6. A system for managing data, comprising:
a browser executing on a computer for opening an application; and
logic for arbitrarily specifying a subset of the opened application as data by analyzing page elements in the browser to determine an application state to capture, causing persistence of different versions of the subset of the application specified data, and recovering the different versions of the subset of the application specified as data, wherein the logic performs causes persistence and recovers different versions of the subset of the application specified as data in a manner transparent to the application;
wherein the logic analyzes the page elements by separating application data components from the rest of the application, determining the type of application data components, loading an appropriate handler for the data components, and accessing handler functions through a generic and consistent interface.

7. The system of claim 6, wherein the logic causes persistence by analyzing available persistence services for storing the application state for later retrieval and storing the application state using an available persistence service.

8. The system of claim 7, wherein the logic recovers by discovering the stored application state, retrieving the stored application state, replacing a current application state with the retrieved application state, suspending an application running in the browser by saving the retrieved application state, and resuming the application based on the saved application state.

9. The system of claim 8, wherein the logic retrieves the stored application state by identifying the persistence service used to store the application state and calling the identified persistence service to retrieve the stored application state.

10. The system of claim 8, wherein the logic replaces the current application state by converting the retrieved application state into data usable by the application and updating the current application state with the converted application state data.

11. A computer program product for managing data, comprising a computer usable medium having a computer readable program, wherein the computer readable program, when executed on a computer, causes the computer to:
open an application in a browser;
arbitrarily specify a subset of the application as data by analyzing page elements in the browser to determine an application state to capture;
cause persistence of different versions of the subset of the application specified as data; and
recover the different versions of the subset of the application specified as data, wherein computer program product causes the computer to cause persistence and perform recovery in a manner transparent to the application;
wherein for analyzing the page elements, the computer readable program causes the computer to:
separate application data components from the rest of the application;
determine the type of application data components;
load an appropriate handler for the data components; and
access handler functions through a generic and consistent interface.

12. The computer program product of claim 11, wherein for causing persistence of different version of the specified subset of data, the computer readable program causes the computer to:
analyze available persistence services for storing the application state for later retrieval; and
storing the application state using an available persistence service.

13. The computer program product of claim 12, wherein for recovering the stored application state, the computer readable program causes the computer to:
discover the stored application state for retrieval;
retrieve the stored application state;
replace a current application state with the retrieved application state;
suspend an application running in the browser by saving the retrieved application state; and
resume the application based on the saved application state.

14. The computer program product of claim 13, wherein for retrieving the stored application state, the computer readable program causes the computer to identify the persistence service used to stored the application state and call the identified persistence service to retrieve the stored application state, and wherein the computer program causes the computer to replace the current application state with the retrieved state by converting the retrieved application state into data usable by the application and updating the current application state with the converted application state data.

* * * * *